US008149466B2

(12) United States Patent
Asano

(10) Patent No.: US 8,149,466 B2
(45) Date of Patent: Apr. 3, 2012

(54) METHOD OF EMBEDDING DATA IN ORIGINAL IMAGE WITH REDUCED EFFECT ON VISIBILITY OF ORIGINAL IMAGE

(75) Inventor: Motohiro Asano, Osaka (JP)

(73) Assignee: Konica Minolta Business Technologies, Inc. (JP)

( * ) Notice: Subject to any disclaimer, the term of this patent is extended or adjusted under 35 U.S.C. 154(b) by 763 days.

(21) Appl. No.: 12/334,801

(22) Filed: Dec. 15, 2008

(65) Prior Publication Data

US 2009/0174912 A1 Jul. 9, 2009

(30) Foreign Application Priority Data

Jan. 8, 2008 (JP) ................................ 2008-001365

(51) Int. Cl.
*H04N 1/40* (2006.01)
*G06K 9/00* (2006.01)

(52) U.S. Cl. ...................................... 358/3.28; 382/100

(58) Field of Classification Search .................. None
See application file for complete search history.

(56) References Cited

U.S. PATENT DOCUMENTS

| 6,795,565 B2 * | 9/2004 | Wendt ............................ 382/100 |
| 2006/0181564 A1 | 8/2006 | Asano ............................. 347/19 |
| 2006/0262957 A1 * | 11/2006 | Asano ........................... 382/100 |

FOREIGN PATENT DOCUMENTS

| JP | 2003-283797 A | 10/2003 |
| JP | 2004-080136 A | 3/2004 |
| JP | 3837999 B2 | 8/2006 |

* cited by examiner

*Primary Examiner* — Twyler Haskins
*Assistant Examiner* — Barbara Reinier
(74) *Attorney, Agent, or Firm* — Cantor Colburn LLP

(57) ABSTRACT

A PC generating image data divides data to be embedded into a predetermined size and arranges it in a predetermined area of a watermarking image. In the predetermined area are defined positions a-h assumed by an information dot configuring an information pattern based on the data to be embedded, and, of positions a-h, a position defined for the information pattern is assumed by a point dot. Of positions a-h, a position that is not defined for the information pattern is assumed by a linear dot. Furthermore in the predetermined area there is a position assumed by a positioning dot defining the predetermined area, and this position is assumed by a point dot. The linear dot has a geometry extending in one of the main scanning direction and vertical scanning direction of an image formation apparatus that allows higher performance in reproducibility for a line.

20 Claims, 16 Drawing Sheets

FIG. 7

|  | DATA TO BE EMBEDDED (5 BITS/1 PATTERN) | |
| --- | --- | --- |
|  | BINARY | DECIMAL |
| 1ST PATTERN | 01110 | 14 |
| 2ND PATTERN | 10100 | 20 |
| 3RD PATTERN | 11110 | 30 |
| 4TH PATTERN | 00101 | 5 |
| 5TH PATTERN | 10000 | 16 |
| 6TH PATTERN | 00000 | 0 |
| 7TH PATTERN | 01001 | 9 |
| 8TH PATTERN | 10111 | 23 |
| 9TH PATTERN | 00010 | 2 |
| 10TH PATTERN | 10001 | 17 |
| 11TH PATTERN | 11010 | 26 |
| 12TH PATTERN | 11111 | 31 |
| 13TH PATTERN | 11000 | 24 |
| 14TH PATTERN | 00101 | 5 |
| 15TH PATTERN | 10001 | 17 |
| 16TH PATTERN | 00111 | 7 |
| 17TH PATTERN | 00001 | 1 |
| 18TH PATTERN | 01011 | 11 |
| 19TH PATTERN | 11101 | 29 |
| 20TH PATTERN | 01101 | 13 |
| 21ST PATTERN | 10010 | 18 |
| 22ND PATTERN | 01111 | 15 |
| 23RD PATTERN | 11001 | 25 |
| 24TH PATTERN | 01000 | 8 |

FIG. 8

| 1ST PATTERN (14) | 2ND PATTERN (20) | 3RD PATTERN (30) | 4TH PATTERN (5) | 5TH PATTERN (16) |
|---|---|---|---|---|
| 6TH PATTERN (0) | 7TH PATTERN (90) | 8TH PATTERN (23) | 9TH PATTERN (2) | 10TH PATTERN (17) |
| 11TH PATTERN (26) | 12TH PATTERN (31) | POSITIONING, PARTICULAR PATTERN | 13TH PATTERN (24) | 14TH PATTERN (5) |
| 15TH PATTERN (17) | 16TH PATTERN (7) | 17TH PATTERN (1) | 18TH PATTERN (11) | 19TH PATTERN (29) |
| 20TH PATTERN (13) | 21ST PATTERN (18) | 22ND PATTERN (15) | 23RD PATTERN (25) | 24TH PATTERN (8) |

1 PIXEL

FIG. 13

[abcd efgh]

| DATA | DOT POSITION |
|---|---|
| 0 | 0000 0111 |
| 1 | 0000 1011 |
| 2 | 0001 0011 |
| 3 | 0010 0011 |
| 4 | 0100 0011 |
| 5 | 1000 0011 |
| 6 | 0000 1101 |
| 7 | 0001 0101 |
| 8 | 0010 0101 |
| 9 | 0100 0101 |
| 10 | 1000 0101 |
| 11 | 0001 1001 |
| 12 | 0010 1001 |
| 13 | 0100 1001 |
| 14 | 1000 1001 |
| 15 | 0011 0001 |
| 16 | 0101 0001 |
| 17 | 1001 0001 |
| 18 | 0110 0001 |
| 19 | 1010 0001 |
| 20 | 1100 0001 |
| 21 | 0000 1110 |
| 22 | 0001 0110 |
| 23 | 0010 0110 |
| 24 | 0100 0110 |
| 25 | 1000 0110 |
| 26 | 0001 1010 |
| 27 | 0010 1010 |
| 28 | 0100 1010 |
| 29 | 1000 1010 |
| 30 | 0011 0010 |
| 31 | 0101 0010 |
| PARTICULAR PATTERN | 1001 0010 |

POSITIONING DOT

PARTICULAR PATTERN

FIG. 20A

| | DATA 0 | DATA 1 | DATA 2 | DATA 3 | DATA 4 | DATA 5 | ... | DATA 30 | DATA 31 |
|---|---|---|---|---|---|---|---|---|---|
| 1ST PATTERN | 0 | 0 | 0 | 0 | 0 | 0 | | 0 | 0 |
| 2ND PATTERN | 0 | 0 | 0 | 0 | 0 | 0 | | 0 | 0 |
| 3RD PATTERN | 0 | 0 | 0 | 0 | 0 | 0 | | 1 | 0 |
| 4TH PATTERN | 0 | 0 | 0 | 0 | 0 | 1 | | 0 | 0 |
| ... | | | | | | | | | |
| 24TH PATTERN | 0 | 0 | 0 | 0 | 0 | 0 | | 0 | 0 |

FIG. 20B

| | DATA 0 | DATA 1 | DATA 2 | DATA 3 | DATA 4 | DATA 5 | ... | DATA 30 | DATA 31 |
|---|---|---|---|---|---|---|---|---|---|
| 1ST PATTERN | 0 | 0 | 0 | 0 | 0 | 0 | | 0 | 0 |
| 2ND PATTERN | 0 | 0 | 0 | 0 | 0 | 0 | | 0 | 0 |
| 3RD PATTERN | 0 | 0 | 0 | 1 | 0 | 0 | | 86 | 0 |
| 4TH PATTERN | 0 | 0 | 0 | 0 | 0 | 67 | | 0 | 0 |
| ... | | | | | | | | | |
| 24TH PATTERN | 0 | 0 | 0 | 0 | 0 | 0 | | 0 | 0 |

US 8,149,466 B2

METHOD OF EMBEDDING DATA IN ORIGINAL IMAGE WITH REDUCED EFFECT ON VISIBILITY OF ORIGINAL IMAGE

This application is based on Japanese Patent Application No. 2008-001365 filed with the Japan Patent Office on Jan. 8, 2008, the entire content of which is hereby incorporated by reference.

BACKGROUND OF THE INVENTION

1. Field of the Invention

The present invention relates generally to methods of generating image data, image data generation apparatuses, and image formation systems, and particularly to methods of generating image data, image data generation apparatuses, and image formation systems, that embed information in image data.

2. Description of the Related Art

Some electronic watermarking technique for documents are known as those embedding information, such as data indicating a copyright holder, in a background of an original image of characters and the like in the form of a woven pattern.

For example, the present inventor has earlier filed some patent applications, now published as US2006/0262957A1 and Japanese Laid-Open Patent Publication No. 2003-283797, which disclose techniques using a plurality of point dots and depending on whether a dot is present or absent to assign 0 (dot absent) and 1 (dot present) to embed information.

Furthermore, as another method, Japanese Patent No. 3837999 and Japanese Laid-Open Patent Publication No. 2004-080136 disclose techniques assigning 0 and 1 to two types of linear dots inclined in different orientations, respectively, to embed information.

It should be noted herein that a dot formed of two-dimensionally uniformly disposed pixels will be referred to as a "point dot" and a dot formed of one-dimensionally disposed pixels will be referred to as a "linear dot". Through human eyes, the dots are both seen as small spots, and they will be referred to herein as dots.

US2006/0262957A1 and Japanese Laid-Open Patent Publication No. 2003-283797 disclose techniques employing only one type of point dot. As such, they are characterized in that they can facilitate detecting embedded data. However, there exists a location without a dot, and in comparison with embedding dots equidistantly, an image having undergone embedment has an unintended pattern caused therein. This provides poor appearance and as a result the original image is poorly visibly recognized.

The techniques disclosed in Japanese Patent No. 3837999 and Japanese Laid-Open Patent Publication No. 2004-080136 embed dots equidistantly and will thus not cause an unintended pattern. However, they require a process in detecting embedded data for determining an orientation of a linear dot, and it is thus difficult to detect data.

Image formation apparatuses provide reproducibility for lines, as will be described hereinafter. Image formation apparatuses form an image by various image formation methods, and electrophotography employing a laser to write on a photoreceptor, a serial head ink jet system, and the like are known as such methods. Electrophotography employing a laser causes the laser to scan to form an electrostatic latent image on a photoreceptor and develops the electrostatic latent image to provide a tonered image which is in turn transferred on a sheet. In the serial head ink jet system, a sheet is fed, while an ink jet head is moved in a direction orthogonal to that in which the sheet is fed to form an image on the sheet. Image formation apparatuses adopting these systems write in a main scanning direction in an order. As such, they exhibit a varying performance in terms of function that joins pixels together more readily in the main scanning direction and less readily in a vertical scanning direction. Note that the vertical scanning direction is a direction corresponding to that in which a sheet (a recording medium) is fed and the main scanning direction is a direction orthogonal to the vertical scanning direction. An image formation apparatus also forms an image by a known image formation method of a line head system having a plurality of recording heads disposed in the main scanning direction. For example, electrophotography employing a light emitting diode (LED) line head employs a plurality of LEDs staggered in the main scanning direction to write on a photoreceptor. Furthermore, a line head ink jet system employs a plurality of ink jet heads staggered in the main scanning direction to write on a sheet in the main scanning direction collectively. These line head system image formation apparatuses have a varying performance in terms of function that more readily joins pixels in the vertical scanning direction and less readily joins pixels in the main scanning direction because of the staggered arrangement in the main scanning direction.

Accordingly, the techniques disclosed in Japanese Patent No. 3837999 and Japanese Laid-Open Patent Publication No. 2004-080136 provide a less stable output for a linear dot having some geometry (or orientation). As a result, a less detectable linear dot is generated, and embedded data is detected with poor precision.

SUMMARY OF THE INVENTION

The present invention has been made to overcome such disadvantages, and it contemplates a method of generating image data, an image data generation apparatus, and an image formation system, that embed data in an original image as a woven pattern with a reduced effect on the original image in visibility and also allow the embedded data to be detected with precision and readily.

To achieve the above object, the present invention in one aspect provides an image data generation method embedding data to be embedded in original image data to generate synthesized image data, the synthesized image data being data for forming an image by an image formation apparatus having a difference in performance between a main scanning direction and a vertical scanning direction in reproducibility for a line, the method comprising the steps of: generating watermarking image data from the data to be embedded; and synthesizing the original image data and the watermarking image data together, the watermarking image data being data that the image formation apparatus is caused to generate such that a first dot having pixels arranged two dimensionally and a second dot having pixels arranged one dimensionally in one of the main scanning direction and the vertical scanning direction that allows higher performance in reproducibility for the line have their respective center positions substantially equidistantly.

The present invention in another aspect provides an image data generation apparatus embedding data to be embedded in original image data to generate synthesized image data, the synthesized image data being data for forming an image by an image formation apparatus having a difference in performance between a main scanning direction and a vertical scanning direction in reproducibility for a line, the image data generation apparatus comprising: a generation unit generating watermarking image data from the data to be embedded; and a synthesis unit synthesizing the original image data and the watermarking image data together, the watermarking image data being data that the image formation apparatus is caused to generate such that a first dot having pixels arranged two dimensionally and a second dot having pixels arranged one dimensionally in one of the main scanning direction and the vertical scanning direction that allows higher performance in reproducibility for the line have their respective center positions substantially equidistantly.

The present invention in still another aspect provides an image formation system comprising: an image formation unit forming on a recording medium an image based on image data; and an image data generation unit embedding data to be embedded in original image data to generate synthesized image data to be provided to the image formation unit, the image formation unit having a difference in performance between a main scanning direction and a vertical scanning direction in reproducibility for a line, the image data generation unit including: a generation unit generating watermarking image data from the data to be embedded; and a synthesis unit synthesizing the original image data and the watermarking image data together, the watermarking image data being data that the image formation unit is caused to generate such that a first dot having pixels arranged two dimensionally and a second dot having pixels arranged one dimensionally in one of the main scanning direction and the vertical scanning direction that allows higher performance in reproducibility for the line have their respective center positions substantially equidistantly.

In accordance with the present invention, a linear dot has a geometry oriented with an image formation apparatus's varying performance in terms of function considered, and a narrow linear dot can also be reproduced stably. Furthermore, in accordance with the present invention, an original image having data embedded therein can have better visibility than when only one type of point dot is used to use a position with a dot and that without a dot to represent embedded data. Furthermore, in accordance with the present invention, data embedded in image data obtained by scanning an image having undergone embedment can be detected with enhanced precision.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 is a diagram for illustrating a specific example of data to be embedded, and how the data to be embedded is divided.

FIG. 8 is a diagram for illustrating how data to be embedded is arranged.

FIG. 13 shows a specific example of an associative relationship between data to be embedded and an information pattern.

FIGS. 20A and 20B show a specific example of a value counted by a counter.

DESCRIPTION OF THE PREFERRED EMBODIMENTS

Figure 1:
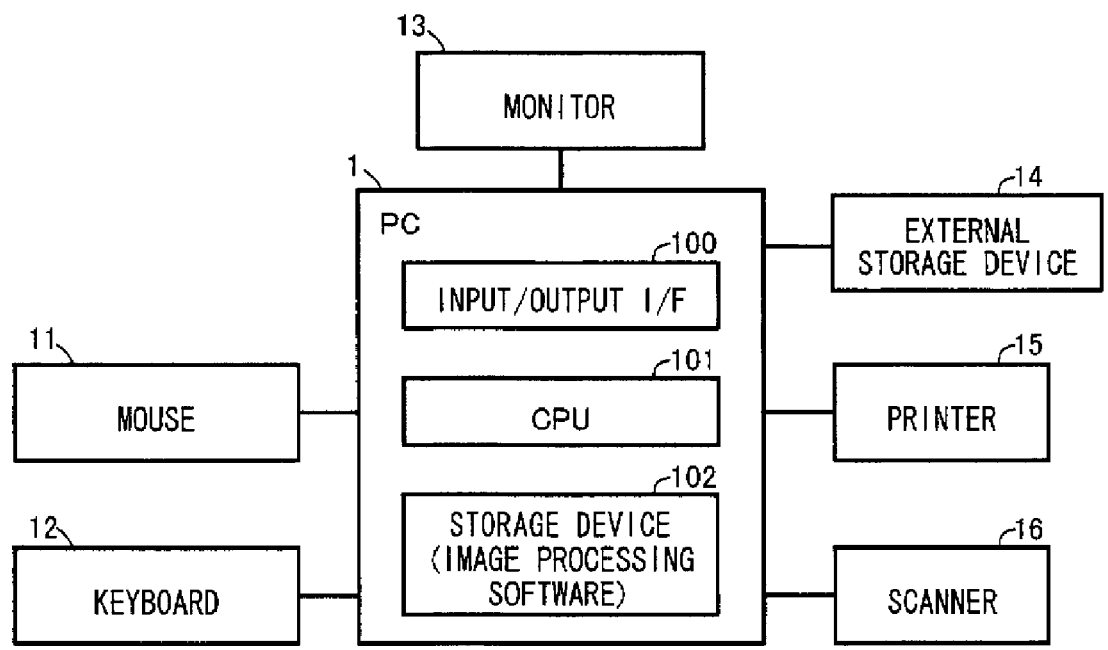
FIG. 1 shows a specific example of a concept in configuration of a personal computer (PC) and its peripheral equipment according to an embodiment.

Hereinafter reference will be made to the drawings to describe the present invention in embodiments. In the following description, identical parts and components are denoted by identical reference characters. Their names and functions are also identical.

In the present embodiment the present image data generation apparatus will be described as that implemented in a personal computer (PC).

FIG. 1 shows a specific example of a concept in configuration of a PC 1 and its peripheral equipment that function as an image data generation apparatus according to the present embodiment. With reference to FIG. 1, PC 1 is connected to an operation input unit implemented by a mouse 11 and a keyboard 12, an image output unit implemented by a monitor 13, an image formation apparatus implemented by a printer 15, an image reading unit implemented by a scanner 16, and one of storage units implemented by an external storage device 14. PC 1 internally includes an input/output interface (I/F) 100 to communicate information with the connected peripheral equipment. Furthermore, PC 1 internally includes an operation unit implemented by a central processing unit (CPU) 101, and one of storage units implemented by a storage device 102. Storage device 102 has image processing software stored therein and CPU 101 reads and executes the image processing software to allow PC 1 to function as the present image data generation apparatus.

Printer 15 is an electrophotographic laser printer. An electrophotographic laser printer causes a laser to scan to form an electrostatic latent image on a photoreceptor and develops the electrostatic latent image to provide a tonered image which is in turn transferred on a sheet. As the electrophotographic laser printer writes in the main scanning direction in an order, it exhibits a varying performance in terms of function that interrupts a dot less in the main scanning direction and more in the vertical scanning direction. It should be noted herein that the vertical scanning direction is a direction corresponding to that in which a sheet (a recording medium) is fed and the main scanning direction is a direction orthogonal to the vertical scanning direction.

It should be noted that the printer is not limited to the electrophotographic laser printer; it may be a serial head ink jet printer or a similar printer of a system forming an image on a sheet while moving an ink jet head in a direction orthogonal to that in which the sheet is fed. Furthermore, it may be a printer of a line head system having a plurality of recording heads arranged in the main scanning direction. In that case, however, it exhibits the varying performance in terms of function that is inverted, and accordingly, a process will be performed to handle it.

Figure 2:
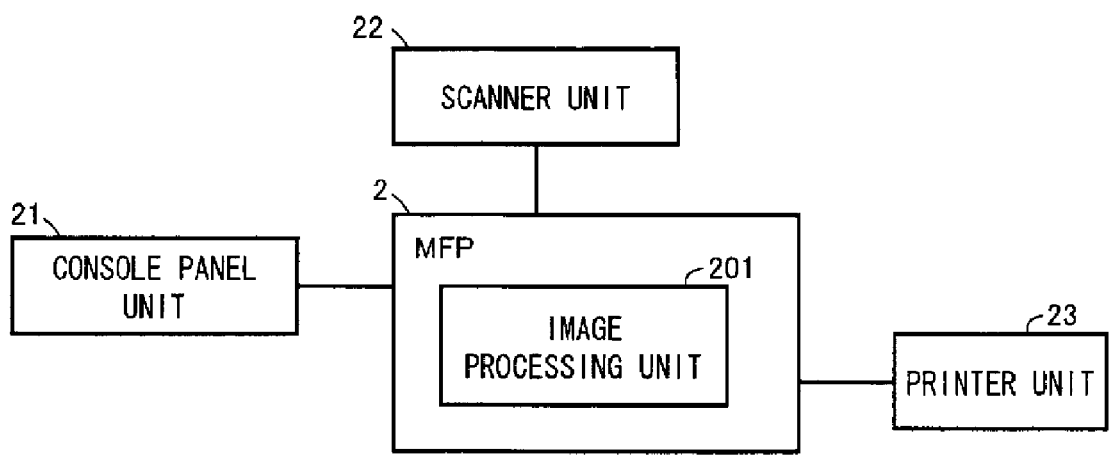
FIG. 2 shows a specific example of a concept in configuration of a multi function peripheral (MFP) functioning as an image data generation apparatus.

The present image data generation apparatus may not be implemented by a PC; it may for example be multi function peripheral (MFP) or a similar image formation apparatus. FIG. 2 shows a specific example of a concept in configuration of an MFP when as another example the present image data generation apparatus is implemented by the MFP. With reference to FIG. 2, the MFP includes a main body unit 2 thereof, an operation input unit implemented by a console panel unit 21, an image reading unit implemented by a scanner unit 22, and an image output unit implemented by a printer unit 23. Furthermore, the MFP's main body unit 2 internally includes an image processing unit 201. Image processing unit 201 performs a process to function as an MFP image data generation apparatus.

Figure 3:
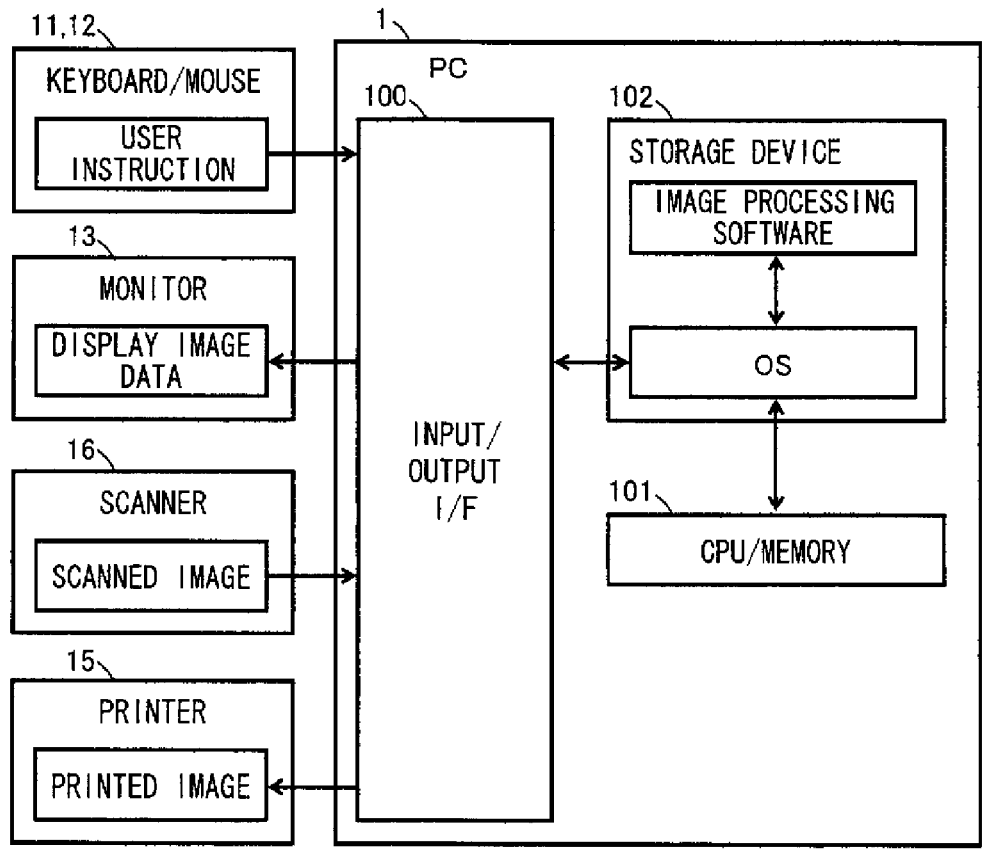
FIG. 3 is a block diagram showing a specific example of a hardware configuration of a PC and its function according to an embodiment.

FIG. 3 is a block diagram showing a specific example of a hardware configuration of PC 1 and its function in the present embodiment. With reference to FIG. 3, PC 1 internally includes input/output I/F 100, CPU 101, and storage device 102, as has been described previously.

Input/output I/F 100 is connected to mouse 11 and keyboard 12 to receive a user instruction input via mouse 11 and/or keyboard 12. Furthermore, input/output I/F 100 is connected to monitor 13 to pass monitor 13 data of an image to be displayed. Furthermore, input/output I/F 100 is connected to scanner 16 to receive an image (or data) scanned by scanner 16 and thus obtained. Furthermore, input/output I/F 100 is connected to printer 15 to pass printer 15 data of an image to be printed.

Storage device 102 stores the aforementioned image processing software and operation software therein. These pieces of software may at least partially be stored in external storage device 14. CPU 101 internally includes memory, and reads software from storage device 102 and loads it in the internal memory and therewhile executes it. In doing so, CPU 101 uses data received through input/output I/F 100 and outputs via input/output I/F 100 to another apparatus the data generated through a process.

CPU 101 executes the image processing software that is stored in storage device 102 to implement an image data generation apparatus, which embeds received data in image data obtained by scanner 16 reading an original image, image data generated by executing application software internal to PC 1 (e.g., document data generated by executing document forming software), and the like. CPU 101 embeds the received data in the image data in the form of a watermarking image of a woven pattern having a predetermined dot pattern. Furthermore, CPU 101 also extracts a woven pattern from image data obtained by scanning a thus generated image and reconstructs embedded original data.

In the following description, an image before having a woven pattern embedded therein will be referred to as an "original image". Data indicating information that is embedded in an original image will be referred to as "data to be embedded"/"embedded data". Data that is generated from data to be embedded and configures a watermarking image to be synthesized with an original image will be referred to as "watermarking (image) data". Data to be embedded is embedded in an original image in the form of a woven pattern represented by a dot configuring watermarking data. Of dots configuring a watermarking image, a dot used to represent data to be embedded will be referred to as an "information dot". A pattern that is configured of an information dot and associated with data to be embedded will be referred to as "information pattern".

Figure 4:
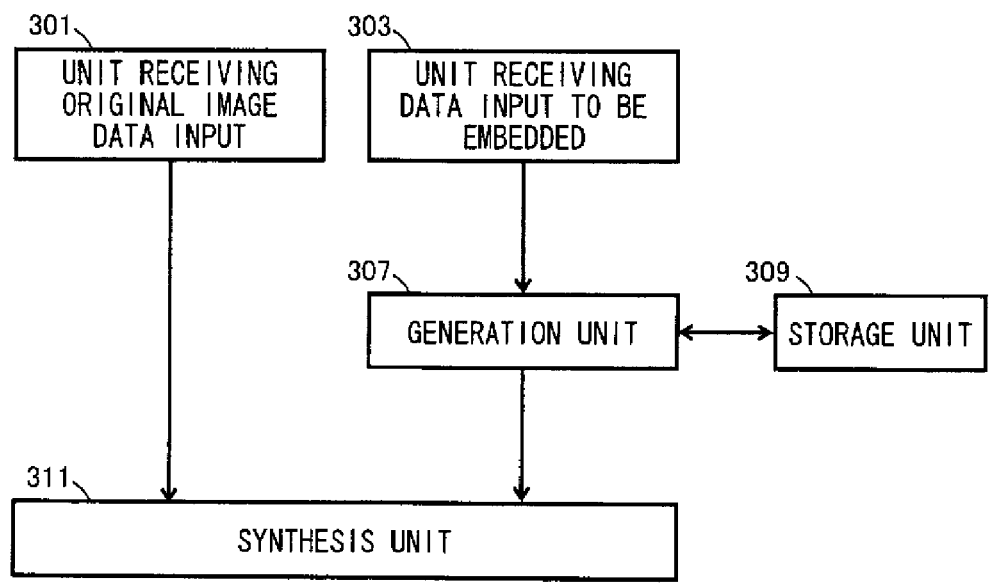
FIG. 4 is a block diagram showing a specific example of a configuration in function of a PC according to an embodiment.

FIG. 4 is a block diagram showing a specific example of a configuration in function of PC 1 in embedding data to be embedded in an original image. FIG. 4 shows functional blocks, which are implemented mainly by CPU 101 executing the image processing software stored in storage device 102. Furthermore, they may be implemented by employing the FIG. 2 hardware configuration.

With reference to FIG. 4, PC 1 implements functional blocks including a unit 301 receiving original image data input, a unit 303 receiving data input to be embedded, a generation unit 307, a storage unit 309, and a synthesis unit 311.

Unit 301 receiving original image data input receives original image data input through input/output I/F 100 as scanner 16 scans an original image. Furthermore, when for example application software stored in PC 1 at storage device 102 is executed, unit 301 receiving original image data input obtains image data generated as the application software is executed. Unit 301 receiving original image data input is connected to synthesis unit 311 and outputs received original image data to synthesis unit 311.

Unit 303 receiving data input to be embedded receives data to be embedded that is input through input/output I/F 100 as mouse 11, keyboard 12 and/or the like are operated. Unit 303 receiving data input to be embedded is connected to generation unit 307 and outputs to generation unit 307 the data to be embedded that is received. Storage unit 309 has an associative relationship between data to be embedded and an information pattern stored therein. Generation unit 307 is connected to storage unit 309 and in accordance with the associative relationship identifies an information pattern from the data to be embedded that is received. In accordance with the identified information pattern, whether an information dot should be arranged at each defined position, which will be described hereinafter, is determined. Furthermore, whether a dot should also be arranged for another defined position is also determined. Furthermore, generation unit 307 is also connected to synthesis unit 311 and outputs to synthesis unit 311 watermarking data configured of the presence/absence of a dot for a defined position. Synthesis unit 311 performs a process for synthesizing the original image data received from unit 301 receiving original image data input and the watermarking data received from generation unit 307, i.e., a process for embedding an information pattern in an original image, and outputs image data thus obtained.

Figure 5:
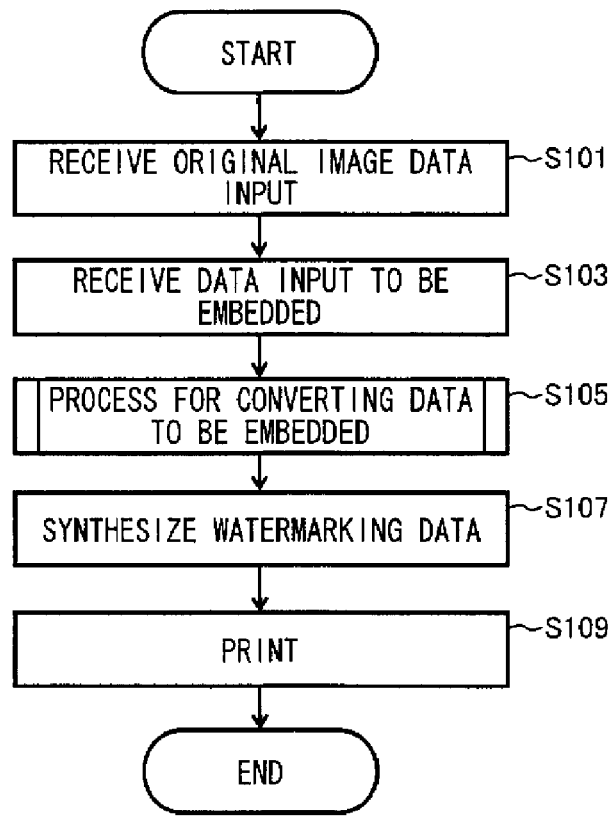
FIG. 5 is a flowchart of a specific example of a process performed in a PC according to the present embodiment to embed data to be embedded in an original image.

FIG. 5 is a flowchart of a specific example of a process performed in PC 1 to embed data to be embedded in an original image. The FIG. 5 process is implemented by CPU 101 executing the image processing software stored in storage device 102.

With reference to FIG. 5, initially the PC 1 unit 301 receiving original image data input receives original image data input obtained through scanner 16 scanning an original image (step S101). Alternatively, it obtains image data generated by executing application software or the like internal to PC 1. Then, unit 303 receiving data input to be embedded receives data input through mouse 11, keyboard 12 and/or the like to be embedded (step S103).

Then, generation unit 307 performs a process for converting the data to be embedded that is input in step S103 to generate watermarking data (step S105), and synthesis unit 311 synthesizes the original image data received in step S101 and the watermarking data generated in step S105 together to generate data of an image to be printed (step S107). The generated image data is transmitted through input/output I/F 100 to printer 15 together with a print control signal and printed by printer 15 (step S109).

Figure 6:
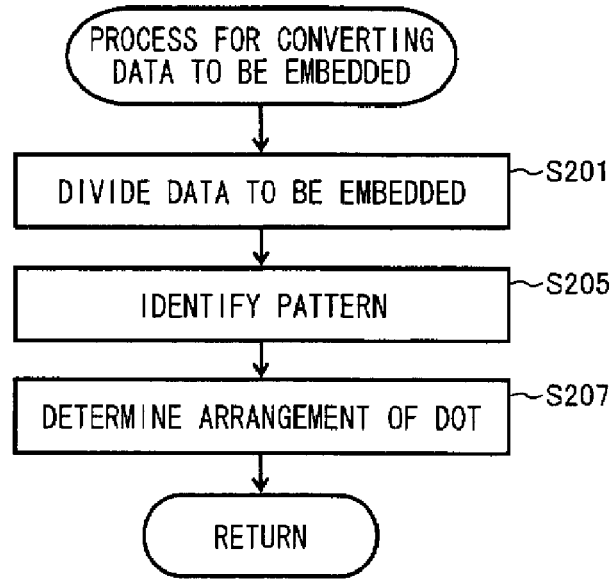
FIG. 6 is a flowchart representing a specific example of a process performed in FIG. 5 at step S105 to convert data to be embedded to generate watermarking data.

Step S105 is performed, as will be described hereinafter with reference to the FIG. 6 flowchart. Initially, generation unit 307 divides the data to be embedded that is received in step S103 to have a predetermined size (step S201). Generation unit 307 identifies a pattern for each area (step S205), and determines in accordance with the identified pattern whether a dot should be present or absent for a defined pixel position (step S207). By the presence/absence of a dot for each pixel position, as determined in step S207, watermarking image data is configured.

The above process allows an image to be printed that is an original image having data received to be embedded therein as a watermarking image.

In step S105, data to be embedded is converted to generate watermarking data through a process, as will be described hereinafter more specifically with reference to a specific example.

Initially, in step S201, the data to be embedded received in step S103, which has 120 bits as one unit, is divided by 5 bits into 24, as shown in FIG. 7. Generation unit 307 refers to the data to be embedded as divided in step S201 to identify a dot pattern corresponding thereto. The 24 dot patterns will be arranged in 24 areas, respectively, each corresponding to a predetermined position in image data. The 24 areas are defined by dividing a block in 5 equal rows and 5 equal columns of 25 equal areas minus a center area, as shown in FIG. 8. The center area is defined as an area assumed by a particular pattern serving as a positioning pattern. For the remaining 24 areas, dot patterns corresponding to the data to be embedded that has been divided in 24 are arranged in an order as defined. Note that the particular pattern may not be arranged in the center area of the block: it may be arranged in any area thereof. In the following description, what is shown in FIG. 8 will entirely be referred to as a "block" and each small region obtained by dividing the block in 25 equally will be referred to as an "area".

Figure 9:
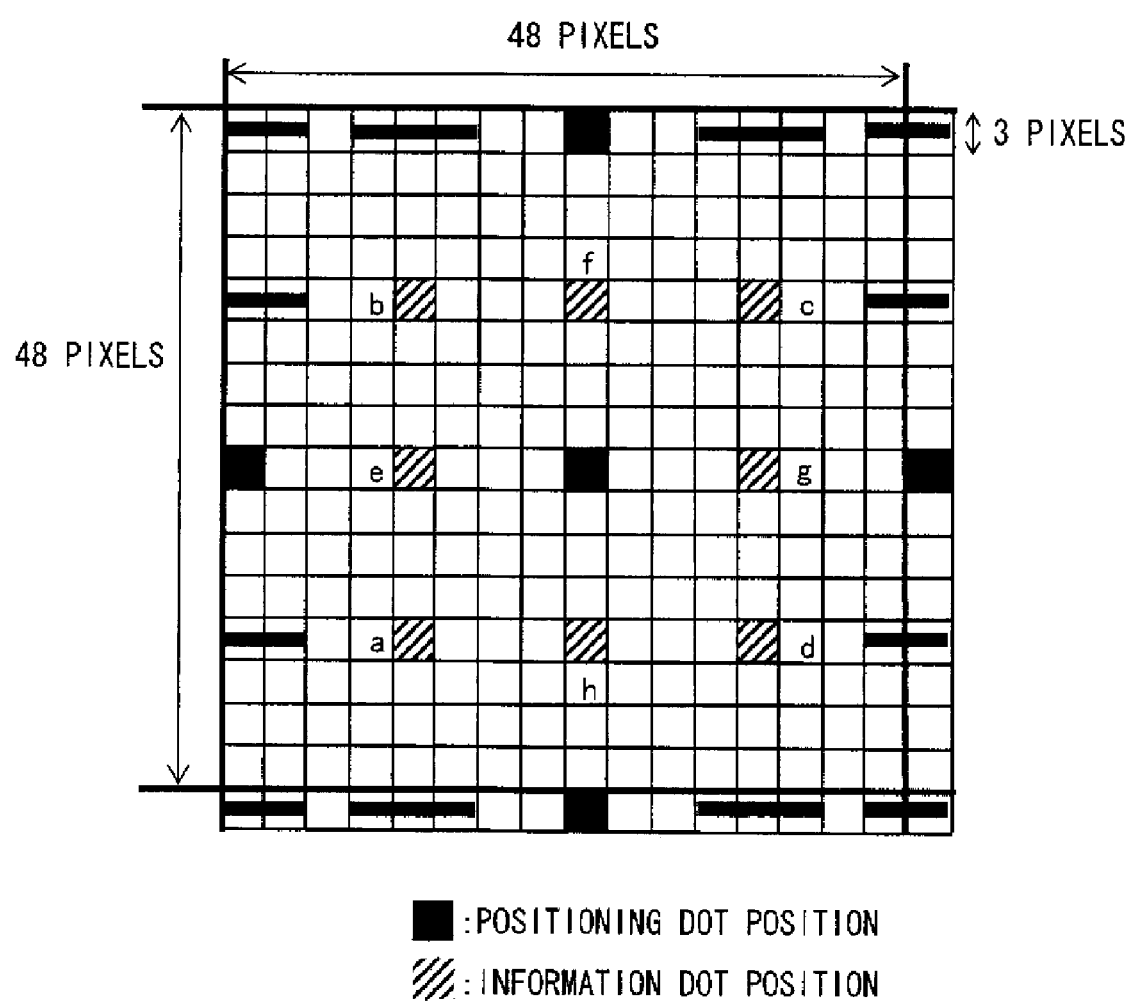
FIG. 9 is a diagram for illustrating a specific example of a configuration of a dot position in a single area.
Figure 10A:
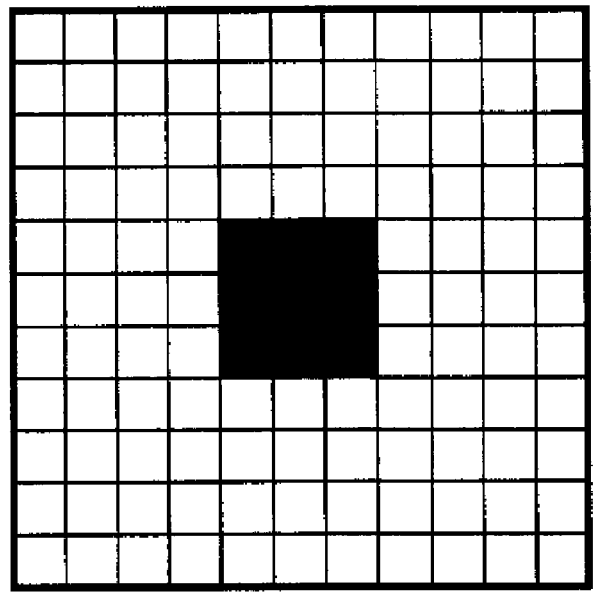
FIG. 10A is a diagram for illustrating a specific example of a point dot in geometry.
Figure 10B:
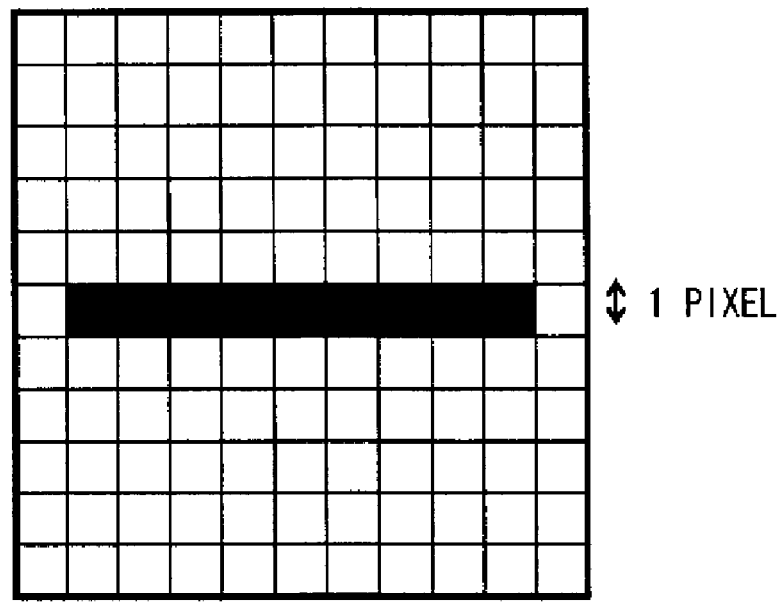
FIG. 10B is a diagram for illustrating a specific example of a linear dot in geometry.

FIG. 9 is a diagram for illustrating a specific example of a configuration of a dot position in a single area. In FIG. 9, image data's resolution is 600 dpi and the area has a size of a matrix of 48 by 48 pixels. A single point dot is formed of a matrix of 3 by 3 pixels, as shown in FIG. 10A. A linear dot is adapted to have a geometry extending in a direction in accordance with the printer's varying performance in terms of function. In the present embodiment printer 15 is an electrophotographic laser printer and exhibits a varying performance in terms of function that interrupts a dot less in the main scanning direction than the vertical scanning direction. Accordingly, the linear dot has a geometry larger in length in a horizontal direction, which corresponds to the main scanning direction, than a vertical direction and formed of one row by nine columns of pixels, as shown in FIG. 10B. The linear dot that is oriented as described above can be stably reproduced even if it is a narrow linear dot.

In the present embodiment, the positions in a single area that are assumed by a matrix of 3 by 3 pixels located at the center of the area, a matrix of 3 by 3 pixels located on a side that is formed of the uppermost 3 rows of pixels at a center as seen in the horizontal direction, and a matrix of 3 by 3 pixels located on a side that is formed of the leftmost 3 columns of pixels at a center as seen in the vertical direction, are used as positioning dot positions. In FIG. 9, they correspond to a position represented by 25th to 27th pixels counted from the area's left end rightward and 25th to 27th pixels counted from the upper end downward, a position represented by 25th to 27th pixels counted from the left end rightward and 1st to 3rd pixels counted from the upper end downward, and a position represented by 1st to 3rd pixels counted from the left end rightward and 25th to 27th pixels counted from the upper end downward. These positioning dot positions are assumed by a positioning dot that is a point dot having a geometry shown in FIG. 10A. A positioning dot is a point dot provided to serve as a reference position to determine a position of a single area for embedding data to be embedded, and in each area it is unfailingly arranged at a positioning dot position. Alternatively, it may be unfailingly arranged at a positioning dot position in each area except an area that is to be assumed by the particular pattern.

Furthermore in the present embodiment there is provided in a single area a square that has its center at a position of a matrix of 3 by 3 pixels located in the area at the center thereof and has each side having a length half that of one side of the area, and a position of a matrix of 3 by 3 pixels located at the center of each side of the square that is equidistant from the center position of the square, as seen upward and downward and rightward and leftward, and a position of a matrix of 3 by 3 pixels corresponding to each vertex of the square are used as information dot positions. In FIG. 9, they correspond to a position represented by 13th to 15th pixels counted from the area's left end rightward and 25th to 27th pixels counted from the area's upper end downward, a position represented by 37th to 39th pixels counted from the left end rightward and 25th to 27th pixels counted from the upper end downward, a position represented by 25th to 27th pixels counted from the left end rightward and 13th to 15th pixels counted from the upper end downward, a position represented by 25th to 27th pixels counted from the left end rightward and 37th to 39th pixels counted from the upper end downward, a position represented by 13th to 15th pixels counted from the left end rightward and 37th to 39th pixels counted from the upper end downward, a position represented by 13th to 15th pixels counted from the left end rightward and 13th to 15th pixels counted from the upper end downward, a position represented by 37th to 39th pixels counted from the left end rightward and 13th to 15th pixels counted from the upper end downward, and a position represented by 37th to 39th pixels counted from the left end rightward and 37th to 39th pixels counted from the upper end downward. These information dot positions are assumed by an information dot of a point dot that configures an information pattern corresponding to data to be embedded, as will be described hereinafter. If an information dot position is a position that is not assumed by an information dot in an information pattern corresponding to data to be embedded, it also corresponds to a position assumed by a linear dot that is a linear dot having a geometry as shown in FIG. 10B (i.e., the former's center matches the latter's center.). If a linear dot is arranged in FIG. 9, it assumes a position represented by 10th to 18th pixels counted from the area's left end rightward and a 26th pixel counted from the upper end downward, a position represented by 34th to 42nd pixels counted from the left end rightward and a 26th pixel counted from the upper end downward, a position represented by 22nd to 30th pixels counted from the left end rightward and a 14th pixel counted from the upper end downward, a position represented by 22nd to 30th pixels counted from the left end rightward and a 38th pixel counted from the upper end downward, a position represented by 10th to 18th pixels counted from the left end rightward and a 38th pixel counted from the upper end downward, a position represented by 10th to 18th pixels counted from the left end rightward and a 14th pixel counted from the upper end downward, a position represented by 34th to 42nd pixels counted from the left end rightward and a 14th pixel counted from the upper end downward, and a position represented by 34th to 42nd pixels counted from the left end rightward and a 38th pixel counted from the upper end downward. Note that for the following description, as shown in FIG. 9, the information dot positions corresponding to the positions of the vertices of the square are indicated as positions a, b, c, d, respectively, as seen clockwise from the position of the lower left vertex of the square. Furthermore, the information dot positions corresponding to the positions each located at a center of a side of the square are indicated as positions e, f, g, h, respectively, as seen clockwise from the position of the center of the left side of the square.

Furthermore in the present embodiment the area is also provided with a linear dot position. More specifically the linear dot position has its center at positions in the area that are: located directly above or under a vertically center positioning dot position on a side of the leftmost 3 columns of pixels and also located on a side of the uppermost 3 rows of pixels, at vertically the same position as information dot positions b, f, c, and at vertically the same position as information dot positions a, h, d; and located on the side of the uppermost 3 rows of pixels at horizontally the same positions as information dot positions b, e, a and c, g, d, and the linear dot position is a position of pixels extended from that center position in a linear dot's lengthwise direction by the linear dot's length. In FIG. 9, it corresponds to a position represented by 1 st to 6th pixels counted from the area's left end rightward and 1st to 3rd pixels counted from the area's right end leftward and 1st to 3rd pixels counted from the area's upper end downward, a position represented by 10th to 18th pixels counted from the left end rightward and 1st to 3rd pixels counted from the upper end downward, a position represented by 34th to 42nd pixels counted from the left end rightward and 1st to 3rd pixels counted from the upper end downward, a position represented by 1st to 6th pixels counted from the left end rightward and 1st to 3rd pixels counted from the right end leftward and 13th to 15th pixels counted from the upper end downward, and a position represented by 1st to 6th pixels counted from the left end rightward and 1st to 3rd pixels counted from the right end leftward and 37th to 39th pixels counted from the upper end downward. These linear dot positions are assumed by a linear dot that is a linear dot having a geometry shown in FIG. 10B.

A linear dot arranged at a linear dot position and a linear dot arranged at an information dot position that is not assumed by an information dot are not dots configuring an information pattern, and are instead so-called dummy dots used to enhance an original image in visibility in a printed matter, as will be described hereinafter. The positioning, information, and linear dot positions assumed by dots to embed a first pattern formed of a point dot and a second pattern formed of a linear dot allow the area to have dots (or their respective centers) present equidistantly in both the vertical and horizontal directions, as shown in FIG. 9. This allows an original image to have a watermarking image embedded therein generally uniformly in density and thus having a reduced effect on the original image in a printed image. This can enhance the original image's visibility. Note that while in the present specific example a watermarking image is configured of the first pattern formed of a point dot and the second pattern formed of a linear dot, only one of the patterns may be used for some information patterns. In other words, it can be said that a watermarking image is configured including at least one of the first and second patterns.

The above described positioning and information dot positions are not limited to specific positions as shown in FIG. 9. The positioning dot position may be any other position that can determine the position of a single area. The information dot position may also be any other position that can maintain an equal or substantially equal distance to the positioning dot position, and may for example include another position set as a linear dot position.

The point dot and the linear dot are also not limited geometrically to those shown in FIG. 10A and FIG. 10B. Furthermore, the point dot is not limited geometrically to a "point" and may have any geometry allowing pixels to be arranged two dimensionally in the main scanning direction and vertical scanning direction of printer 15. For example, the point dot may have another geometry formed of one row and three columns of pixels forming a rectangle and three rows and one column of pixels forming a rectangle, with the rectangles traversing each other, as shown in FIG. 11A.

Similarly, the linear dot is also not limited geometrically to a "line", and it may be of any one dimensional geometry in that pixels are arranged with preference given to one of the main scanning direction and vertical scanning direction of printer 15 that allows higher performance in reproducibility for a line, i.e., the main scanning direction. For example, the linear dot may have another geometry of one row and nine columns of pixels forming a rectangle dotless for every other pixel, as shown in FIG. 11B. When such a linear dot having a geometry dotless for every other pixel as shown in FIG. 11B is printed, it is reproduced as an uninterrupted thin line because of an effect of a dot gain or the like. In particular, printer 15 is an electrophotographic laser printer and has a functional feature that interrupts a dot less in the main scanning direction, as has been described previously, and accordingly, if a linear dot has its length in the main scanning direction and is dotless in that direction for every other pixel, it is reproduced as an uninterrupted thin line. In contrast, if the linear dot has its length in a direction having a tendency to interrupt it, i.e., in the vertical scanning direction in this example, and has a geometry dotless for every other pixel, the linear dot may be interrupted. In that case, it may be have a portion reproduced in a geometry similar to a point dot, which can result in poor precision for detection.

Figure 11A:
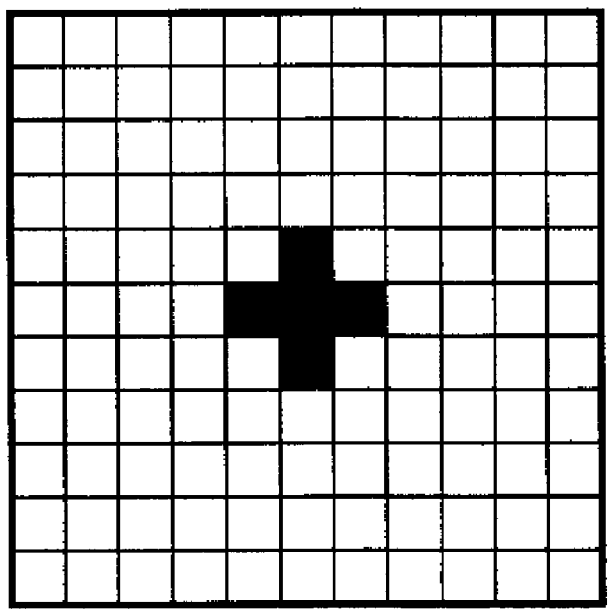
FIG. 11A is a diagram for illustrating another specific example of the point dot in geometry.
Figure 11B:
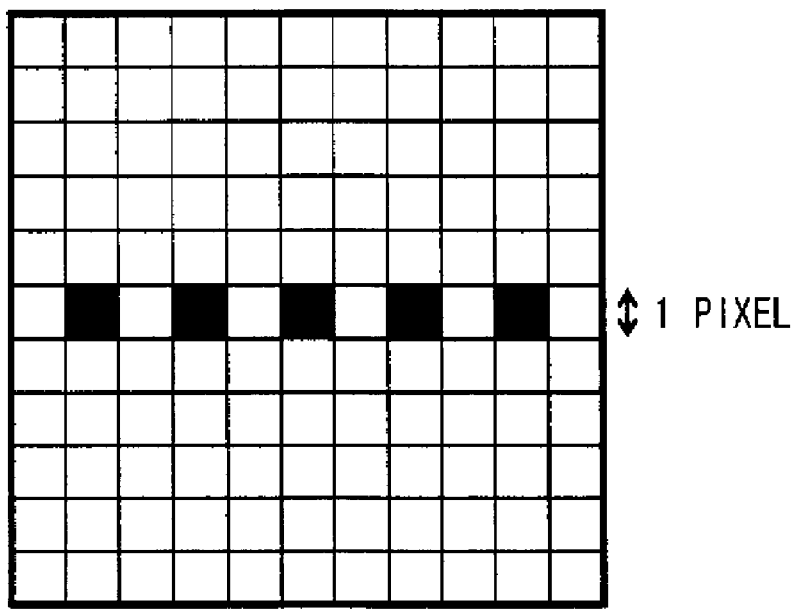
FIG. 11B is a diagram for illustrating another specific example of the linear dot in geometry.

The point dot and the linear dot that have geometry as shown in FIG. 11A and FIG. 11B can provide a watermarking image generally reduced in density and thus having a further reduced disadvantageous effect on an original image. If information is embedded as a watermarking image having a function so that when it is copied a predetermined image thereof (e.g., a copy deterrent character) manifests on the copy and is thus printed, the watermarking image excluding the predetermined image can have its portion formed of dots having such a geometry as shown in FIG. 11A and FIG. 11B to prevent the portion from readily manifesting when it is copied.

Figure 12A:
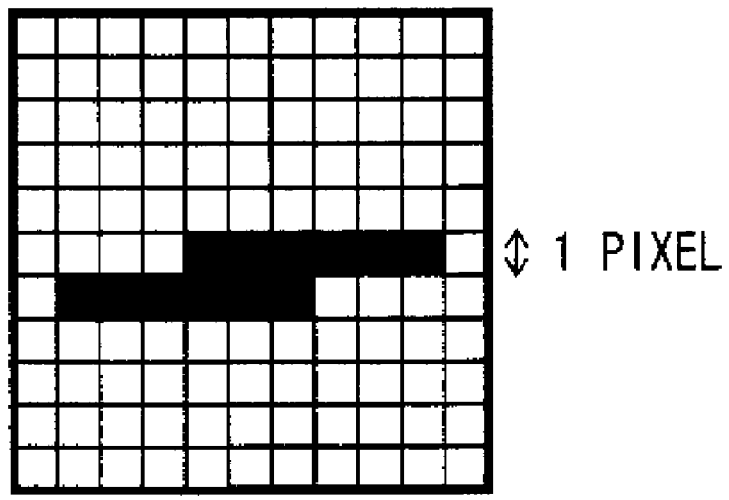
FIGS. 12A and 12B are diagrams for illustrating still another specific example of the linear dot in geometry.
Figure 12B:
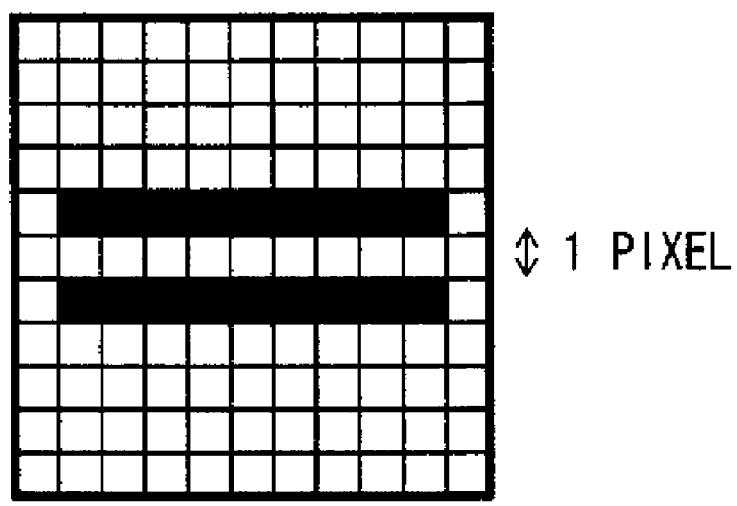

Furthermore, the linear dot may have another geometry, as shown in FIG. 12A, of one row and nine columns of pixels forming a rectangle, two such rectangles being arranged side by side as seen vertically such that they are offset by approximately three pixels as seen lengthwise. Furthermore, as shown in FIG. 12B, it may be one row and nine columns of pixels forming a rectangle, two such rectangles being arranged side by side as seen vertically such that they are spaced by one pixel as seen vertically. The linear dots having such geometry as shown in FIG. 12A and FIG. 12B allow a watermarking image to have a linear dot increased in density. For example if printer 15 has relatively poor performance in providing an uninterrupted dot in the main scanning direction and hence poor line reproducibility, a watermarking image including a linear dot can be ensured to facilitate detecting an information pattern from the watermarking image.

FIG. 13 shows a specific example of an associative relationship between data to be embedded and an information pattern that storage unit 309 stores therein. If an area has an information dot position defined as shown in FIG. 9, storage unit 309 has an information pattern, i.e., an information dot position that is actually assumed by an information dot, stored therein for each of data to be embedded, as divided. In FIG. 13 an information pattern is configured of an 8-bit value defining whether an information dot is present/absent for each information dot position, i.e., positions a-h, such that "1" indicates that the dot is present and "0" indicates that the dot is absent. Furthermore, in FIG. 13, the information dot positions or positions a-h have only three thereof to be assumed by an information dot, and 32 information patterns are defined. Furthermore, as a pattern different from the 32 information patterns, the particular pattern is also similarly defined.

In step S205 generation unit 307 refers to the associative relationship stored in storage unit 309 as shown in FIG. 13 to identify an information pattern corresponding to data to be embedded (as divided). And in step S207 it determines whether an information dot should be present or absent for each of the information dot positions or positions a-h. That is, it determines to arrange an information dot in the form of a point dot at an information dot position that is defined to be assumed by the information dot.

Furthermore in step S207 generation unit 307 determines for an information dot position that it determines is not assumed by an information dot in accordance with the FIG. 13 associative relationship to arrange a dummy dot in the form of a linear dot with its center placed at the position. Furthermore, generation unit 307 determines to arrange at a predefined positioning dot position a point dot serving as a positioning dot and arrange a linear dot at a predefined linear dot position. Note that if an area of interest corresponds to the position of the particular pattern in a block, generation unit 307 determines to arrange a point dot and a linear dot at a position defined in FIG. 13 as the particular pattern.

Figure 14:
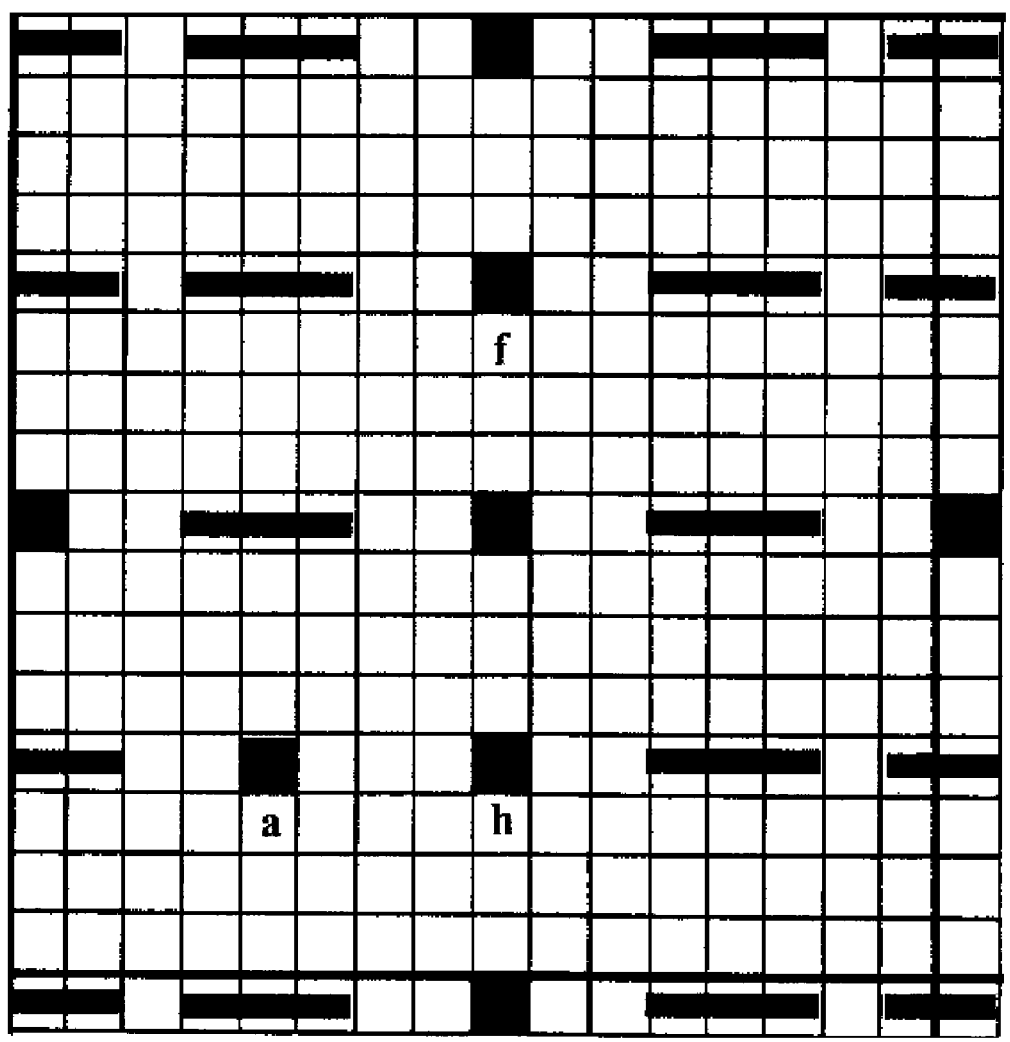
FIG. 14 shows as a specific example of an information pattern an information pattern corresponding to data to be embedded "10".

For example if an information pattern of data "10" to be embedded as divided is formed in an area of interest, then generation unit 307 in step S205 refers to the FIG. 13 associative relationship to identify an information pattern, i.e., that, of the information dot positions or positions a-h, positions a, f, h are assumed by information dots, respectively, and the remaining positions are not assumed thereby. In step S207, generation unit 307 determines to arrange a point dot for positions a, f, h and a linear dot for the remaining positions. Furthermore, it determines to arrange at a positioning dot position a point dot serving as a positioning dot and arrange at a linear dot position a linear dot serving as a dummy dot. In other words, if in step S205 data "10" to be embedded as divided is arranged in an area of interest, an information pattern shown in FIG. 14 is determined and data "10" to be embedded is converted into watermarking data.

Figure 15:
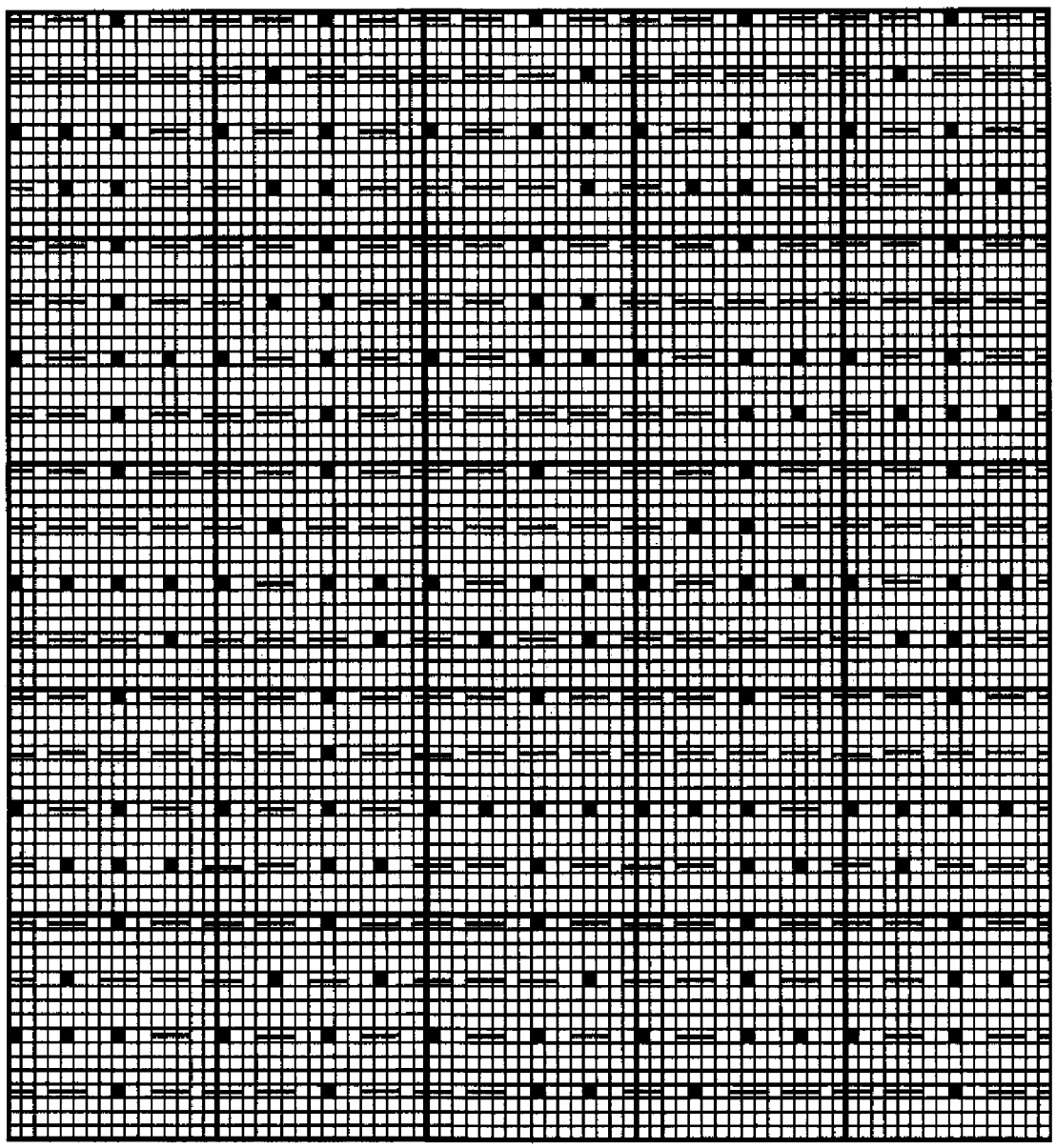
FIG. 15 shows as a specific example of a watermarking image a watermarking image obtained as the FIG. 7 data to be embedded is converted.
Figure 16:
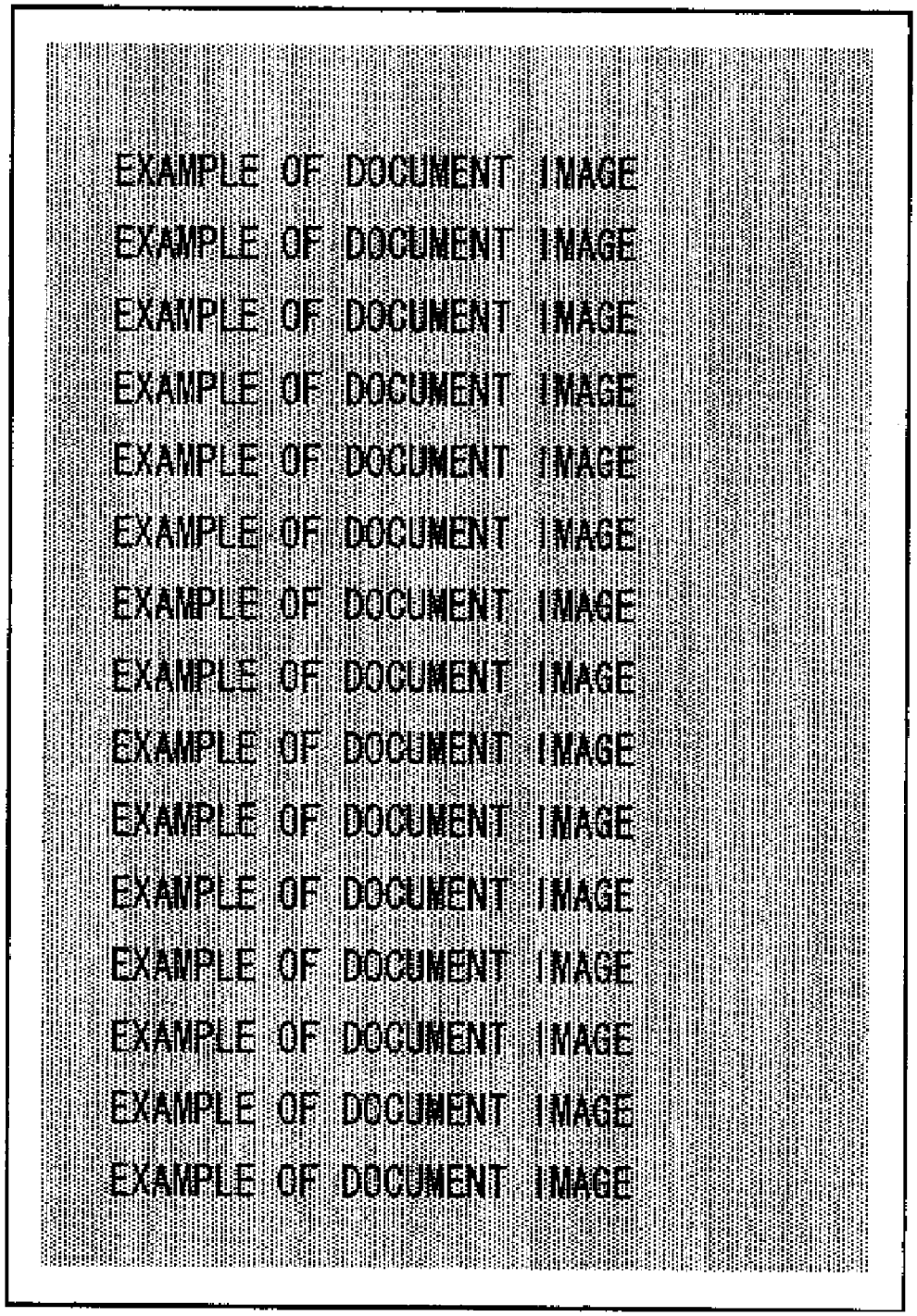
FIG. 16 shows a specific example of an image printed.

In steps S205 and 207 generation unit 307 performs this process for all areas to convert data to be embedded into watermarking data. If in step S103 the FIG. 7 data to be embedded is received, then watermarking data obtained through the S105 conversion represents a watermarking image shown in FIG. 15. Then in step S107 synthesis unit 311 synthesizes original image data and the watermarking data together and in step S109 an image is printed as shown in FIG. 16. In step S107 the watermarking data generated in step S105 is repeatedly arranged for the entirety of the size of a printing sheet of interest to synthesize the data with an original image. Thus, as shown in FIG. 16, a printed image has an original image with a background having a watermarking image printed therein substantially uniformly in density.

Figure 17:
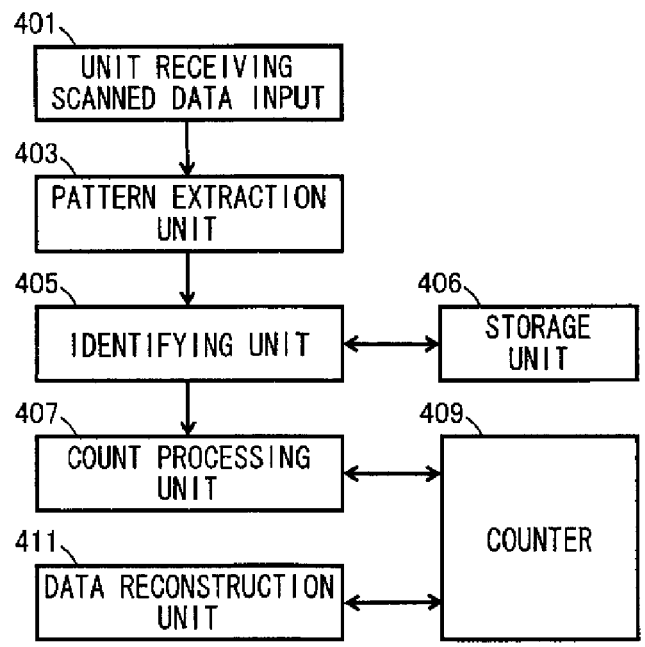
FIG. 17 is a block diagram showing a specific example of a configuration in function of a PC according to an embodiment.

FIG. 17 is a block diagram showing a specific example of a configuration in function of PC 1 in extracting and reconstructing embedded data from a printed image having the data embedded in an original image, as described above. Hereinafter, such printed image will also be referred to as a "woven pattern-added image". FIG. 17 shows functional blocks, which are implemented mainly by CPU 101 executing the image processing software stored in storage device 102. Furthermore, they may be implemented by employing the FIG. 2 hardware configuration.

With reference to FIG. 17, PC 1's above functional blocks include a unit 401 receiving scanned data input, a pattern extraction unit 403, an identifying unit 405, a storage unit 406, a count processing unit 407, a counter 409, and a data reconstruction unit 411.

Unit 401 receiving scanned data input receives image data input through input/output I/F 100 as scanner 16 scans a woven pattern-added image. Unit 401 receiving scanned data input is connected to pattern extraction unit 403 to output the received image data to pattern extraction unit 403.

Pattern extraction unit 403 receives the image data and extracts a point dot therefrom. Pattern extraction unit 403 has previously stored a position assumed in an area by a positioning dot position, and extracts a positioning dot from extracted point dots and in accordance therewith extracts an information pattern. Furthermore, pattern extraction unit 403 has a particular pattern previously stored, and identifies the particular pattern from extracted information patterns to identify a block. Furthermore, pattern extraction unit 403 has previously stored a positional relationship that each information pattern has with the particular pattern, i.e., a positional relationship of areas in a single block, and pattern extraction unit 403 determines an order of each information pattern extracted. Furthermore, pattern extraction unit 403 is connected to identifying unit 405 to output to identifying unit 405 information indicating an extracted information pattern and information indicating a position of an area in a block that has the information pattern embedded therein.

Storage unit 406 has stored therein such an associative relationship between data to be embedded and an information pattern as shown in FIG. 13, similarly as has been previously described for storage unit 309. Furthermore, identifying unit 405 is connected to storage unit 406 and count processing unit 407 to identify embedded data (as divided) that is arranged for each area from an information pattern received from pattern extraction unit 403 that is stored in storage unit 406, and identifying unit 405 outputs it to count processing unit 407.

Counter 409 is a histogram memory that stores for image data to be processed the embedded data (as divided) that has been identified by an information pattern for each area. Count processing unit 407 is connected to counter 409 to store the embedded data (as divided) that is arranged for each area, as based on information received from identifying unit 405, to counter 409. Data reconstruction unit 411 is connected to counter 409 and identify for each area the embedded data (as divided) for which counter 409 provides the highest count value, and in accordance with the positions of the areas in the block combine their respective such data together to reconstruct the embedded data.

Figure 18:
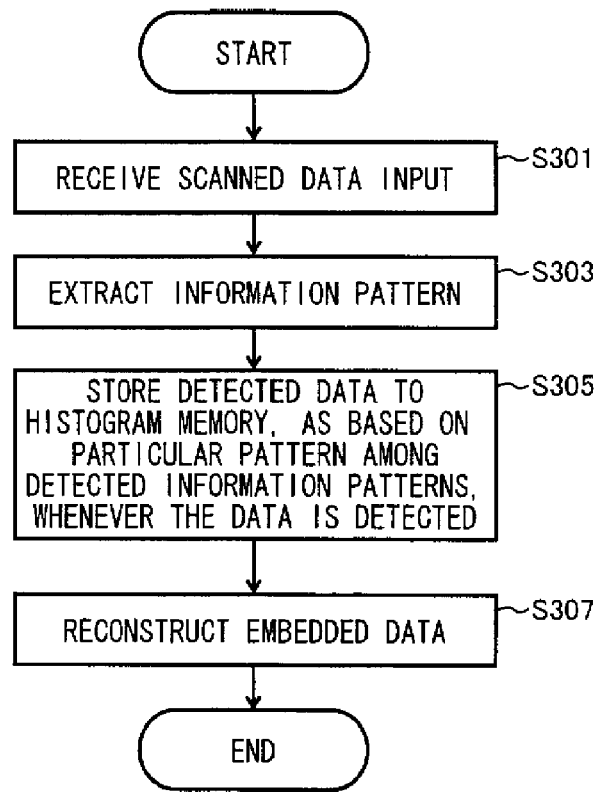
FIG. 18 is a flowchart of a specific example of a process performed in a PC according to an embodiment to extract and reconstruct embedded data from image data obtained from a scanned woven pattern-added image.

FIG. 18 is a flowchart of a specific example of a process performed in PC 1 to extract and reconstruct embedded data from image data obtained from a scanned woven pattern-added image. The FIG. 18 process is implemented by CPU 101 executing the image processing software stored in storage device 102.

With reference to FIG. 18, initially, unit 401 receiving scanned data input receives image data input through input/output I/F 100 as scanner 16 scans a woven pattern-added image (step S301).

Figure 19:
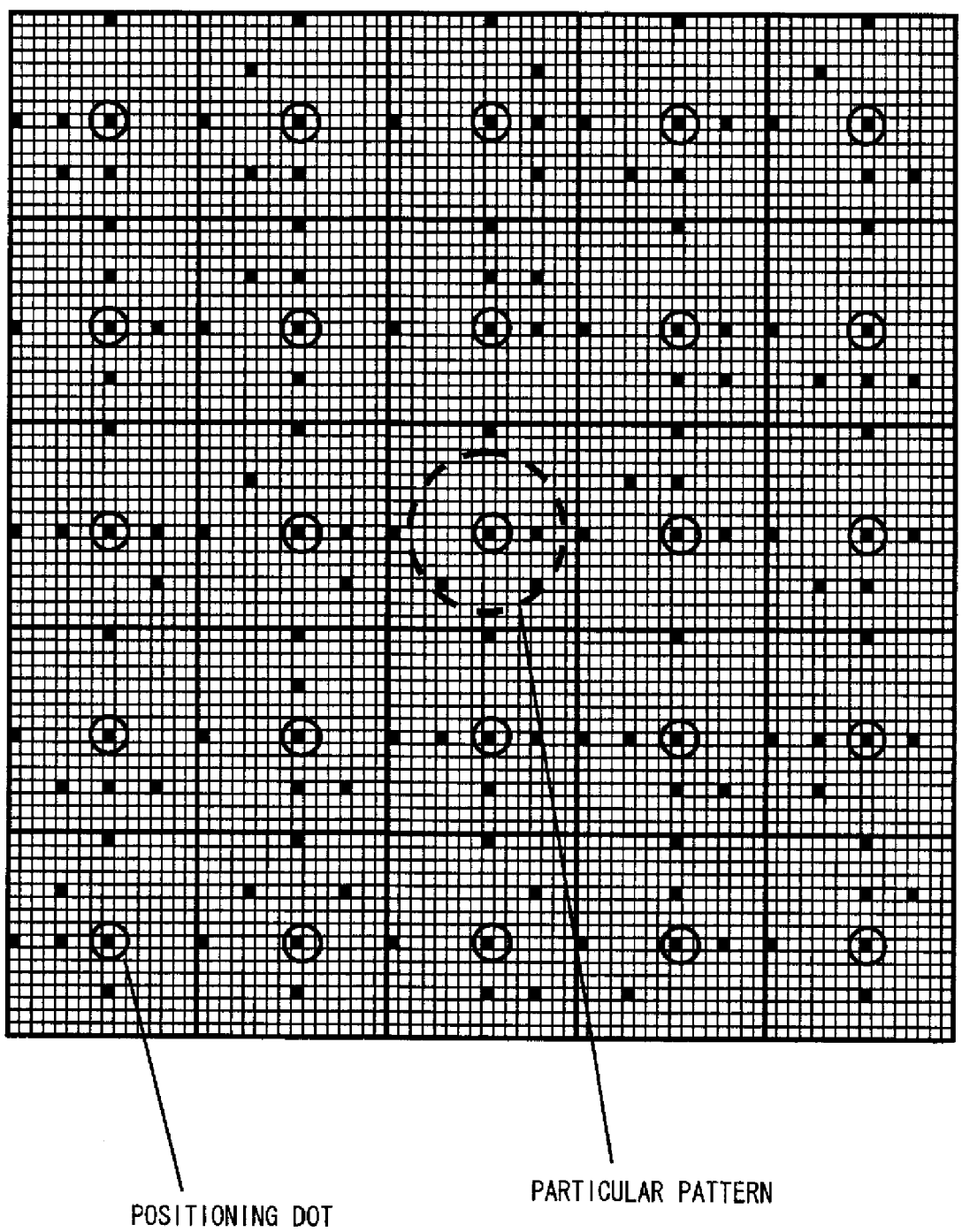
FIG. 19 shows as a specific example of a resultant detection provided by a PC according to an embodiment a point dot detected from image data obtained by scanning a woven pattern-added image having embedded therein data to be embedded that is represented by the FIG. 15 watermarking image.

Then, pattern extraction unit 403 extracts a point dot from the image data received in step S301 to extract an information pattern (step S303). For example if in step S301 a woven pattern-added image having embedded therein data represented by the FIG. 15 watermarking image is scanned and image data thus obtained is input, then in step S303 pattern extraction unit 403 extracts a point dot from the image data, as shown in FIG. 19. Herein the method of extracting the point dot is not limited to any particular method. However, as one specific example, the following method can be adopted. More specifically, as has been described previously, if a woven pattern-added image is printed at a resolution of 600 dpi with a point dot represented by a matrix of 3 by 3 pixels forming a rectangle (or a square) and a linear dot represented by one row and nine columns of pixels forming a rectangle, then it is assumed that scanner 16 scans at a resolution of 200 dpi. This represents the point dot in the scanned data by one row and one column of a pixel forming a rectangle (or a square), and does not represent the linear dot. Accordingly when the FIG. 15 watermarking image is thus scanned a point dot is extracted from the scanned image, as shown in FIG. 19.

If in step S301 image data is input with the original inclined, then in step S303 preferably the inclination is corrected. The method of correcting the inclination is not limited to any particular method. However, as one specific example, a method that is described in an earlier patent application filed by the present Inventor and published as US2006/0181564A1 can be adopted as will be described hereinafter. More specifically, the image data received in step S301 is processed by each of a plurality of filters detecting dots arranged in the woven pattern-added image equidistantly that correspond to a plurality of inclinations, respectively, to calculate an agreement, and that of the highest agreement is set as an angle of inclination and correction is done to allow the angle of inclination to be 0.

If in step S303 point dots are extracted from image data, as shown in FIG. 19, pattern extraction unit 403 detects a positioning dot therefrom, as shown in FIG. 19, (i.e., a circle indicated in FIG. 19 by solid line).

The method of detecting a positioning dot is also not limited to any particular method. However, as one specific example, a method that is described in an earlier patent application filed by the present Inventor and published as US2006/0262957A1 can be adopted as will be described hereinafter. More specifically, a filter that previously defines a positioning dot position in an area can be used to detect a point dot of that position to detect a positioning dot and thus identify each area.

Pattern extraction unit 403 determines an information dot position from a positioning dot position of each area, detects an information dot, and extracts an information pattern. When pattern extraction unit 403 detects the particular pattern in such extracted patterns, as indicated in FIG. 19 by a circle indicated by a dotted line, pattern extraction unit 403 determines that an area corresponding thereto is the block's center position, and pattern extraction unit 403 identifies a block defined by a matrix of 5 by 5 areas.

Then, identifying unit 405 and count processing unit 407 increment by one for each area identified in step S303 a count value of counter 409 in the form of a histogram memory that corresponds to (embedded data (as divided) corresponding to) an extracted information pattern (step S305).

If each area has a positional relationship determined as shown in FIG. 8, then whenever an information pattern extracted for each area is extracted count processing unit 407 increments by one a count value of counter 409 that corresponds thereto, as shown in FIG. 20A. FIG. 20A indicates that in accordance with the FIG. 13 associative relationship, data 30 and 5 are extracted once from areas "third pattern" and "forth pattern", respectively, i.e., areas, as seen in FIG. 8, located in the uppermost row and third and forth columns, respectively, as counted in the figure from the left end.

A block representing such a watermarking image as shown in FIG. 19 is repeatedly embedded in the entirety of a woven pattern-added image. For some original images, however, a dot in an original may for example overlap an information dot position and an arranged information dot may thus not be detected or a dot in an original may be detected as an information dot. In step S305, even for such a case, a count value of counter 409 that corresponds to an information dot extracted as based on a point dot detected from an information dot position for each area is incremented whenever the information dot is extracted. Accordingly, to exclude a result of extraction based on an information dot erroneously detected as has been described previously, after all blocks included in image data of interest are processed as described above data reconstruction unit 411 sets the embedded data that has the largest count value of counter 409 for each area as embedded data (as divided) embedded in that area. And in accordance with the defined areal positional relationship, the embedded data having such largest count values are combined together in their order to reconstruct embedded data (step S307). For example, all blocks are processed as described above and thereafter if counter 409 provides values as shown in FIG. 20B, they indicate that for the area "third pattern" i.e., an area, as seen in FIG. 8, located in the uppermost row and the third column as counted in the figure from the left end, data 3 is detected once and data 30 is detected 86 times. In that case, data 30 has the largest count value, as indicated in FIG. 20B by an oval, and in step S307 data reconstruction unit 411 determines that the embedded data arranged in that area is data 30. Similarly, for the area "fourth pattern" i.e., the area located in the uppermost row and the fourth column from the left end, it also determines that the embedded data arranged in that area is data 5.

By the above process, embedded data is extracted from image data obtained from a scanned woven pattern-added image. The embedded data extracted may be added at a predetermined position and thus printed in scanning and printing the woven pattern-added image. Furthermore, it may be displayed on monitor 13. Furthermore, it may be used in an authentication process, a process performed to restrict printing, and the like.

Note that the above described specific example uses an information dot in the form of a point dot. If an information dot is in the form of a point dot, it is not necessary to consider orientation, i.e., it can eliminate the necessity of performing a process for determining orientation and thus be detected through a simpler process than when it is a linear dot. Furthermore, if a woven pattern-added image that is scanned is inclined, it is not necessary to consider orientation, and an information dot can be more readily detected than when it is a linear dot.

However, an information dot is not limited to a point dot, and similarly, an information dot may be in the form of a linear dot and a positioning dot and a dummy dot may be in the form of a point dot. In that case, a linear dot that is detected from image data obtained from a scanned woven pattern-added image can have its center position replaced with a dot of a single pixel to allow an information pattern, such as shown in FIG. 19, to be obtained. Thereafter, a similar process can be performed to reconstruct embedded data. Thus if an information dot is in the form of a linear dot, and for example an original image includes a hatching pattern, the information dot can be detected from the hatched portion readily and hence with higher precision. Furthermore this case requires only a single type of linear dot (i.e., a linear dot of a single orientation) and can dispense with a process for determining a line's orientation. This allows the linear dot to be detected more readily than when two types of linear dots (i.e., linear dots of two orientations) are used.

Note that in the above specific example the present image data generation apparatus implemented as PC 1 or an MFP performs a process for embedding data to be embedded in an original image as a watermarking image, and a process for extracting and reconstructing embedded data from image data obtained from a scanned woven pattern-added image. However, the two processes may be done in different apparatuses, respectively.

Furthermore, a program can also be provided that causes a computer to perform the process for embedding data to be embedded in an original image as a watermarking image, and the process for extracting and reconstructing embedded data from image data obtained from a scanned woven pattern-added image. Such a program can also be stored in a flexible disc, compact disk-read only memory, (CD-ROM), read only memory (ROM, random access memory (RAM), a memory card and/or a similar computer readable storage medium accompanying the computer, and can be provided as a program product. Alternatively, it can be stored and provided in a storage medium such as a hard disc incorporated in the computer. Furthermore, it can also be downloaded through a network and thus provided.

Note that the program may be a program allowing a necessary one of program modules that are provided as part of an operating system (OS) of the computer, a printer driver and the like to be invoked in a predetermined sequence, as timed as predetermined, to cause a process to be performed. In that case, the program per se does not include the module, and cooperates with the OS, the printer driver and the like to perform the process.

Furthermore the program may be incorporated in a portion of another program and thus provided. The program in that case also does not include the module included in the other program, and the former program cooperates with the latter program to perform a process.

The program product provided is installed in a hard disc or a similar program storage unit and executed. Note that the program product includes the program per se and a storage medium having the program stored therein.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image data generation method embedding data to be embedded in original image data to generate synthesized image data, said synthesized image data being data for forming an image by an image formation apparatus having a difference in performance between a main scanning direction and a vertical scanning direction in reproducibility for a line, the method comprising the steps of:
generating watermarking image data from said data to be embedded, said watermarking image data being data that said image formation apparatus is caused to generate such that a first dot having pixels arranged two dimensionally and a second dot having pixels arranged one dimensionally in one of said main scanning direction and said vertical scanning direction that allows higher performance in reproducibility for said line having their respective center positions substantially equidistantly; and
synthesizing said original image data and said watermarking image data together.

2. The image data generation method according to claim 1, wherein one of said first dot and said second dot is used to represent said data to be embedded, and the other is to be formed at a position that is not assumed by said dot representing said data to be embedded.

3. The image data generation method according to claim 2, wherein said first dot is used to represent said data to be embedded.

4. The image data generation method according to claim 2, wherein said second dot is used to represent said data to be embedded.

5. The image data generation method according to claim 1, wherein said first dot is formed of a plurality of pixels arranged in both said main scanning direction and said vertical scanning direction in equal numbers, respectively.

6. The image data generation method according to claim 1, wherein said second dot is formed of a plurality of pixels arranged in only one of said main scanning direction and said vertical scanning direction.

7. The image data generation method according to claim 1, wherein said second dot is formed of a plurality of pixels arranged one dimensionally and discretely in one of said main scanning direction and said vertical scanning direction that allows said higher performance in reproducibility for said line.

8. The image data generation method according to claim 1, wherein said second dot is formed of more than one plurality of pixels arranged one dimensionally in one of said main scanning direction and said vertical scanning direction that allows said higher performance in reproducibility for said line.

9. The image data generation method according to claim 1, wherein the step of generating said watermarking image data includes the steps of:
dividing said data to be embedded into a plurality of data;
selecting a dot pattern corresponding to said data to be embedded as divided; and
arranging at a predetermined position said dot pattern selected.

10. An image data generation apparatus embedding data to be embedded in original image data to generate synthesized image data, said synthesized image data being data for forming an image by an image formation apparatus having a difference in performance between a main scanning direction and a vertical scanning direction in reproducibility for a line, the image data generation apparatus comprising:
a generation unit generating watermarking image data from said data to be embedded, said watermarking image data being data that said image formation apparatus is caused to generate such that a first dot having pixels arranged two dimensionally and a second dot having pixels arranged one dimensionally in one of said main scanning direction and said vertical scanning direction that allows higher performance in reproducibility for said line having their respective center positions substantially equidistantly; and
a synthesis unit synthesizing said original image data and said watermarking image data together.

11. The image data generation apparatus according to claim 10, wherein one of said first dot and said second dot is used to represent said data to be embedded, and the other is to be formed at a position that is not assumed by said dot representing said data to be embedded.

12. The image data generation apparatus according to claim 11, wherein said first dot is used to represent said data to be embedded.

13. The image data generation apparatus according to claim 11, wherein said second dot is used to represent said data to be embedded.

14. The image data generation apparatus according to claim 10, wherein said first dot is formed of a plurality of pixels arranged in both said main scanning direction and said vertical scanning direction in equal numbers, respectively.

15. The image data generation apparatus according to claim 10, wherein said second dot is formed of a plurality of pixels arranged in only one of said main scanning direction and said vertical scanning direction.

16. The image data generation apparatus according to claim 10, wherein said second dot is formed of a plurality of pixels arranged one dimensionally and discretely in one of said main scanning direction and said vertical scanning direction that allows said higher performance in reproducibility for said line.

17. The image data generation apparatus according to claim 10, wherein said second dot is formed of more than one plurality of pixels arranged one dimensionally in one of said main scanning direction and said vertical scanning direction that allows said higher performance in reproducibility for said line.

18. The image data generation apparatus according to claim 10, wherein said generation unit includes:
a division unit dividing said data to be embedded into a plurality of data;
a selection unit selecting a dot pattern corresponding to said data to be embedded as divided by said division unit; and
an arrangement unit arranging at a predetermined position said dot pattern selected by said selection unit.

19. An image formation system comprising:
an image formation unit forming on a recording medium an image based on image data, said image formation unit having a difference in performance between a main scanning direction and a vertical scanning direction in reproducibility for a line; and
an image data generation unit embedding data to be embedded in original image data to generate synthesized image data to be provided to said image formation unit, said image data generation unit including:
a generation unit generating watermarking image data from said data to be embedded, said watermarking image data being data that said image formation unit is caused to generate such that a first dot having pixels arranged two dimensionally and a second dot having pixels arranged one dimensionally in one of said main scanning direction and said vertical scanning direction that allows higher performance in reproducibility for said line having their respective center positions substantially equidistantly; and
a synthesis unit synthesizing said original image data and said watermarking image data together.

20. The image formation system according to claim 19, wherein said image formation unit is a laser printer causing a laser to scan and thus forming an electrostatic latent image on a photoreceptor.

* * * * *